United States Patent
Boundy et al.

(10) Patent No.: US 9,096,177 B2
(45) Date of Patent: Aug. 4, 2015

(54) APPARATUS FOR SECURING A RECHARGEABLE ELECTRONIC DEVICE WITH RESPECT TO A SURFACE OF A WIRELESS BATTERY CHARGING APPARATUS OF A VEHICLE

(75) Inventors: Timothy M. Boundy, Rochester Hills, MI (US); Andrew J. Farah, Troy, MI (US); Paul Zubrickas, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 13/557,453

(22) Filed: Jul. 25, 2012

(65) Prior Publication Data

US 2013/0038280 A1   Feb. 14, 2013

Related U.S. Application Data

(60) Provisional application No. 61/523,201, filed on Aug. 12, 2011.

(51) Int. Cl.
| | |
|---|---|
| *H01J 7/00* | (2006.01) |
| *B60R 7/04* | (2006.01) |
| *B60R 11/02* | (2006.01) |
| *H02J 7/00* | (2006.01) |
| *H02J 7/02* | (2006.01) |
| *B60R 11/00* | (2006.01) |

(52) U.S. Cl.
CPC . *B60R 7/04* (2013.01); *B60R 11/02* (2013.01); *H02J 7/0044* (2013.01); *H02J 7/025* (2013.01); *B60R 2011/0007* (2013.01)

(58) Field of Classification Search
CPC ..... Y02T 90/128; Y02T 90/16; Y02T 90/168; B60L 11/1846; B60L 11/1851; B60L 11/1812; B60L 2230/40; H04B 5/0037; G01R 31/3689
USPC .................................................. 320/113, 115
See application file for complete search history.

(56) References Cited

U.S. PATENT DOCUMENTS

| | | | |
|---|---|---|---|
| 6,738,249 B1 | 5/2004 | Anthony et al. | |
| 6,888,438 B2 | 5/2005 | Hui et al. | |
| 7,164,255 B2 | 1/2007 | Hui | |
| 8,783,752 B2* | 7/2014 | Lambert et al. | 296/24.34 |
| 8,816,636 B2* | 8/2014 | Shinde et al. | 320/108 |
| 2008/0265835 A1 | 10/2008 | Reed et al. | |

(Continued)

FOREIGN PATENT DOCUMENTS

| | | |
|---|---|---|
| CN | 1409942 A | 4/2003 |
| CN | 101317268 A | 12/2008 |

(Continued)

OTHER PUBLICATIONS

State Intellectual Property Office of the Peoples' Republic of China, Office Action for Chinese Patent Application No. 201210334205.4, mailed Jun. 4, 2014.

(Continued)

*Primary Examiner* — Nghia Doan
(74) *Attorney, Agent, or Firm* — Ingrassia Fisher & Lorenz, P.C.

(57) ABSTRACT

Methods, system and apparatus are provided for securing a rechargeable electronic device with respect to a surface of a wireless battery charging apparatus of a vehicle.

19 Claims, 6 Drawing Sheets

(56) References Cited

U.S. PATENT DOCUMENTS

2010/0264871 A1* 10/2010 Matouka et al. .............. 320/108
2011/0156637 A1    6/2011 Thorsell et al.

FOREIGN PATENT DOCUMENTS

| CN | 101657337 | A  | 2/2010  |
|----|-----------|----|---------|
| CN | 101971453 | A  | 2/2011  |
| CN | 201781332 | U  | 3/2011  |
| CN | 102077438 | A  | 5/2011  |
| JP | 2007104868 | A | 4/2007  |
| JP | 2009296780 | A | 12/2009 |
| KR | 20100133557 | A | 12/2010 |
| WO | 2008040200 | A1 | 4/2008 |

OTHER PUBLICATIONS

State Intellectual Property Office of the Peoples' Republic of China, Office Action for Chinese Patent Application No. 201210332217.3, mailed May 28, 2014.

USPTO, Office Action in U.S. Appl. No. 13/557,441, mailed Oct. 15, 2014.

USPTO, Response to Non-Final Office Action in U.S. Appl. No. 13/557,441, mailed Nov. 3, 2014.

U.S. Appl. No. 13/557,441, filed Jul. 25, 2012.

USPTO, Notice of Allowance and Fee(s) Due for U.S. Appl. No. 13/557,441, mailed Jan. 21, 2015.

* cited by examiner

APPARATUS FOR SECURING A RECHARGEABLE ELECTRONIC DEVICE WITH RESPECT TO A SURFACE OF A WIRELESS BATTERY CHARGING APPARATUS OF A VEHICLE

CROSS REFERENCE TO RELATED APPLICATIONS

This application claims the benefit of U.S. Provisional Application No. 61/523,201, filed Aug. 12, 2011, the contents of which are herein incorporated by reference.

TECHNICAL FIELD

Embodiments of the present invention generally relate to vehicles, and more particularly relate to battery charging systems and apparatus implemented within a vehicle for charging rechargeable electronic devices.

BACKGROUND OF THE INVENTION

Today a wide variety of electronic devices are commercially available that are powered by power cells commonly referred to as batteries. Many such power cells are rechargeable electrochemical cells also referred to as rechargeable batteries. Electronic devices that include such rechargeable electrochemical cells can be referred to as rechargeable electronic devices.

Examples of rechargeable electronic devices include modern mobile communication devices, such as computers, cellular telephones portable/mobile radios, personal digital assistants, video terminals, portable/mobile computers with wireless modems, and other wireless communication devices. For purposes of the following discussions, a wireless communication device may also referred to in the art as a subscriber device, a mobile station, mobile equipment, a handset, a mobile subscriber, user equipment, or an equivalent used in any wireless communication standard.

A wired charger device can be used to recharge the power cells in such devices. For example, cellular phones and other wireless communication devices have traditionally been charged via a wired charger device that includes a plug-in cord. The wired charger device connects to a power jack socket on the rechargeable electronic device. The power jack socket is wired to contacts with the terminals of the rechargeable electrochemical cells. The wired charger itself usually consists of a plug box containing a step-down transformer and an AC-DC converter or rectifier which is wired via a charging cable to a connecting plug. When in use, the plug box is plugged into an electrical outlet (a 120 V or securing block 240 V mains socket) or a USB port if the charger is USB compatible. The connecting plug is coupled to the rechargeable electronic device that is to be charged.

There are numerous drawbacks associated with wired charger devices. Wired charger devices are bulky items to carry around, and the wire trailing between the device and the plug box can be unsightly. Therefore most users of compact portable equipment such as cell phones and the like do not carry wired chargers with them. Moreover, if the trailing wire is snagged or jerked the wire and connectors, the socket or the wall may be damaged. Furthermore, the rechargeable electronic device may be pulled to the ground. In addition, because not all manufacturers use the same type of wired charger, if a user forget or looses their cable it's not always easy to find a replacement. These are just a few examples of some of the drawbacks or problems that are regularly associated with such "wired chargers."

Recently, inductive battery charger systems have been developed such as the system described in U.S. Pat. No. 7,164,255 to Hui, which is incorporated herein by reference in its entirety. In Hui's system a planar inductive battery charging system is designed to enable electronic devices to be recharged without wires, and can therefore be referred to as a wireless battery charging system. The system includes a planar charging module. The planar charging module has a charging surface or mat, and parallel to the charging surface, is at least one primary coil or winding, and in some cases an array of primary coils or windings. The planar charging module can be plugged into an electrical power source (e.g., a standard outlet, or a USB port). An electronic device to be recharged is placed on the charging surface, and the primary coil(s) can then inductively couple energy to a secondary coil of the device to be recharged. In some conventional electronic devices that do not include secondary coils when manufactured, a separate module (sometimes referred to a receiver) can be coupled to the conventional electronic device to allow it to work with the wireless charger. The receiver has secondary coil(s) that allow the device to be charged via magnetic induction.

SUMMARY

To eliminate the need for wired chargers, General Motors (GM) has proposed integrating wireless or inductive chargers into a vehicle to implement a wireless battery charging system within the vehicle for wirelessly charging rechargeable electronic devices. These systems and apparatus include a wireless charging module that has a charging surface, and one or more windings parallel to the charging surface (e.g., an array of primary windings parallel to the charging surface). This will allow occupants (e.g., drivers and passengers) to place their rechargeable electronic devices on a charging surface or "mat" within the vehicle and wirelessly recharge them while in the vehicle.

Wireless chargers such as those described above are normally implemented within a home or office environment, where the user can simply place the rechargeable electronic device on surface of the wireless charger so that it rests on that surface. When integrating wireless chargers into a vehicle to develop a vehicle-based wireless charging system, many problems arise since a vehicle is a far different environment than a home or office environment.

One problem that arises is due to the fact that motor vehicles are often in motion. As such, simply placing a rechargeable electronic device on a surface of a wireless charger can be problematic since the rechargeable electronic device can move about on the surface while the vehicle is in motion. If it moves enough it will no longer be in contact with the wireless charger and the rechargeable electronic device will not charge. In some cases, the rechargeable electronic device may slide off the surface of the wireless charger completely making it difficult to locate the rechargeable electronic device.

Embodiments of the present disclosure relate to wireless charging systems and wireless charging apparatus (also referred to herein as a "wireless charging device" or "wireless charger") that are implemented within a vehicle for wirelessly charging rechargeable electronic devices within the vehicle. This eliminates the need for wired chargers that require a cable or cord plugged into an outlet.

In some embodiments, a vehicle is provided that includes a wireless charging apparatus mounted within the vehicle, and a securing apparatus. The securing apparatus is configured to secure a battery or rechargeable electronic device in a fixed position with respect to the wireless charging apparatus.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Figure 1:
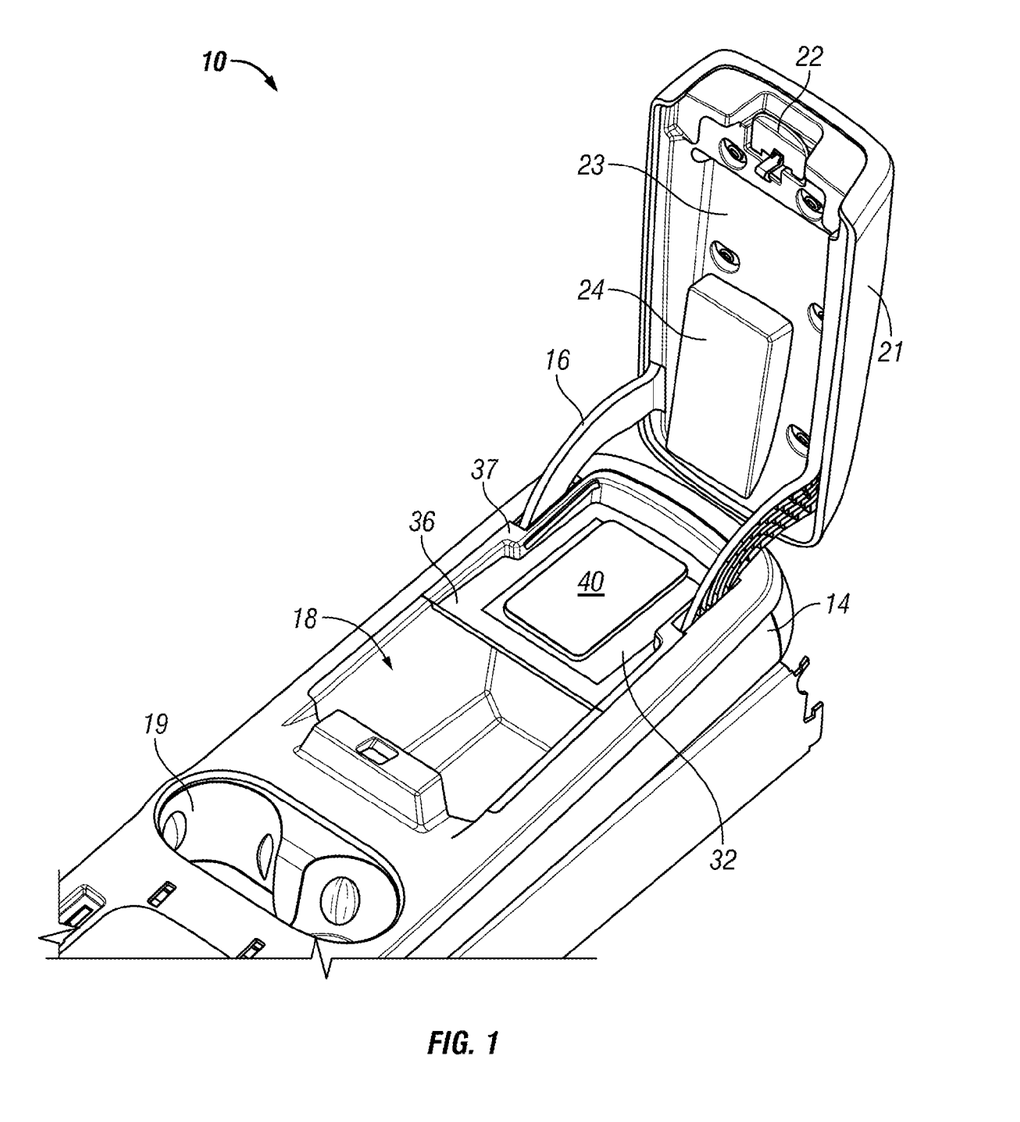
FIGS. 1, 3 and 4 are perspective views of a floor console armrest assembly in accordance with some of the disclosed embodiments.
Figure 2:
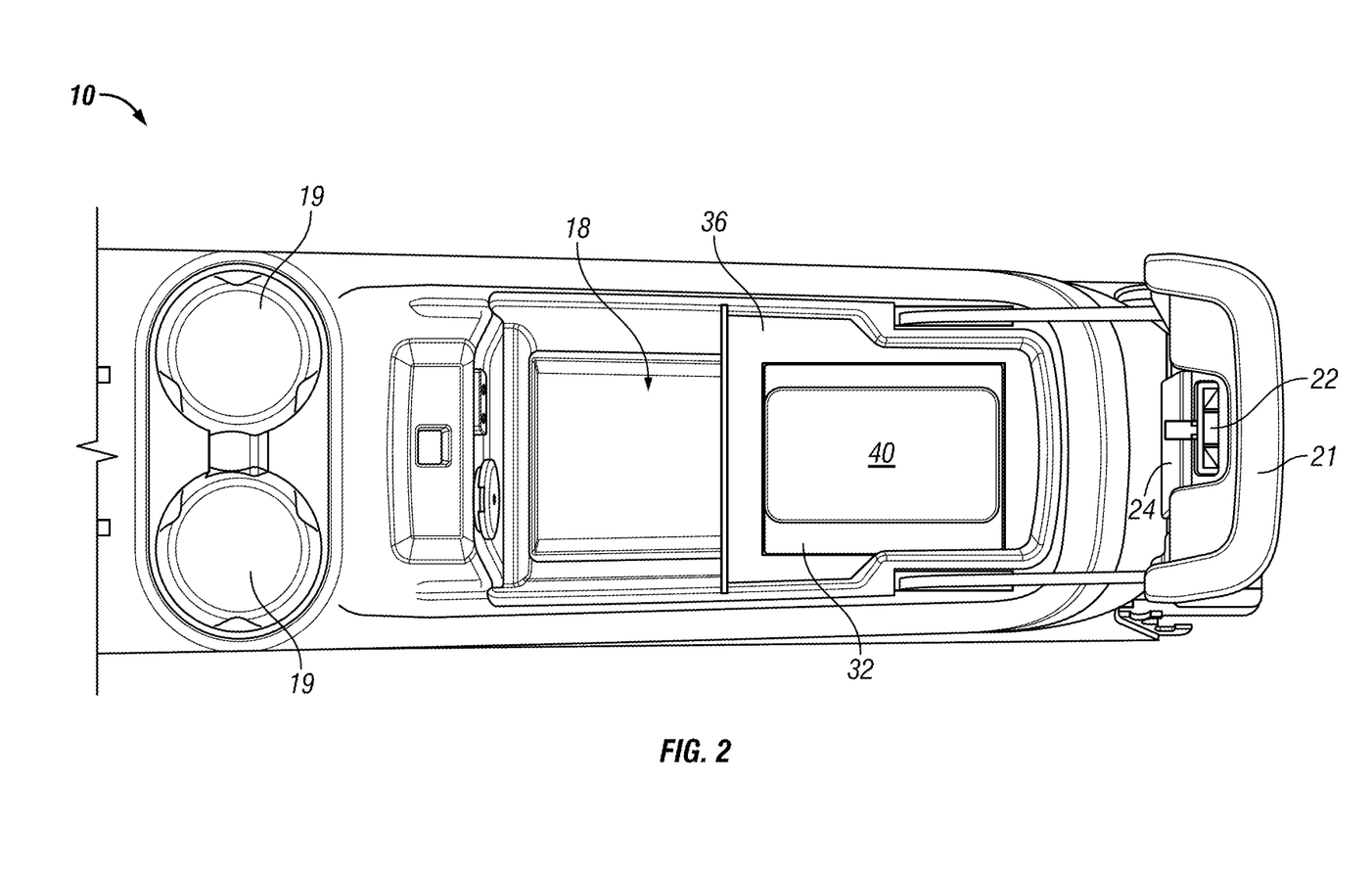
FIG. 2 is a top view of a floor console armrest assembly in accordance with some of the disclosed embodiments.
Figure 3:
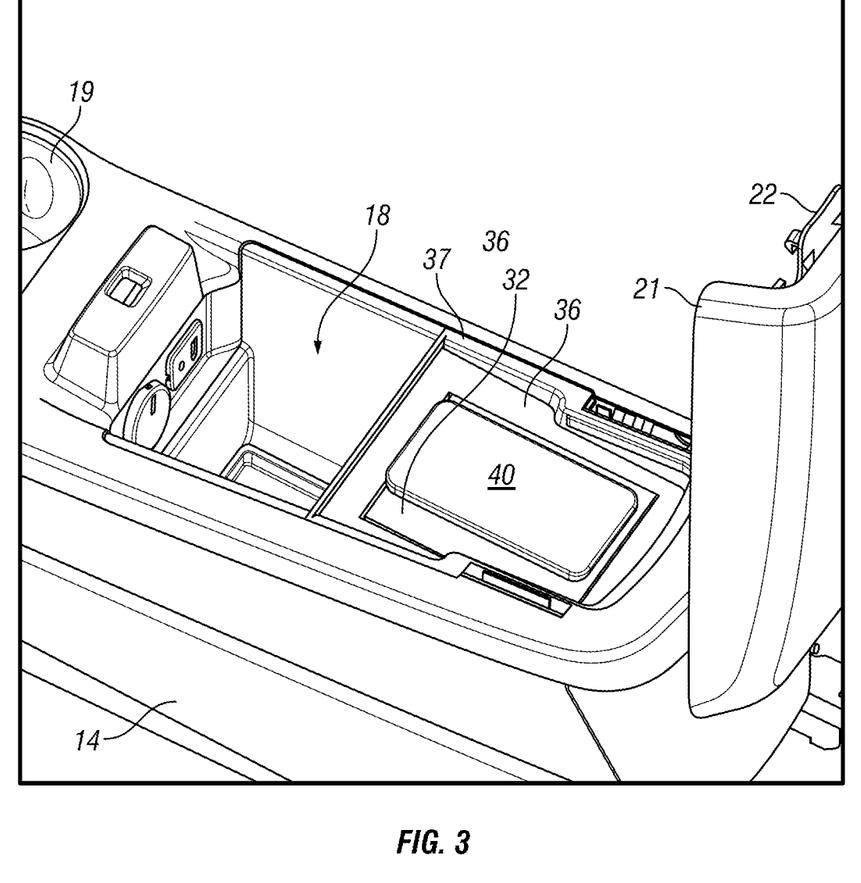
Figure 4:
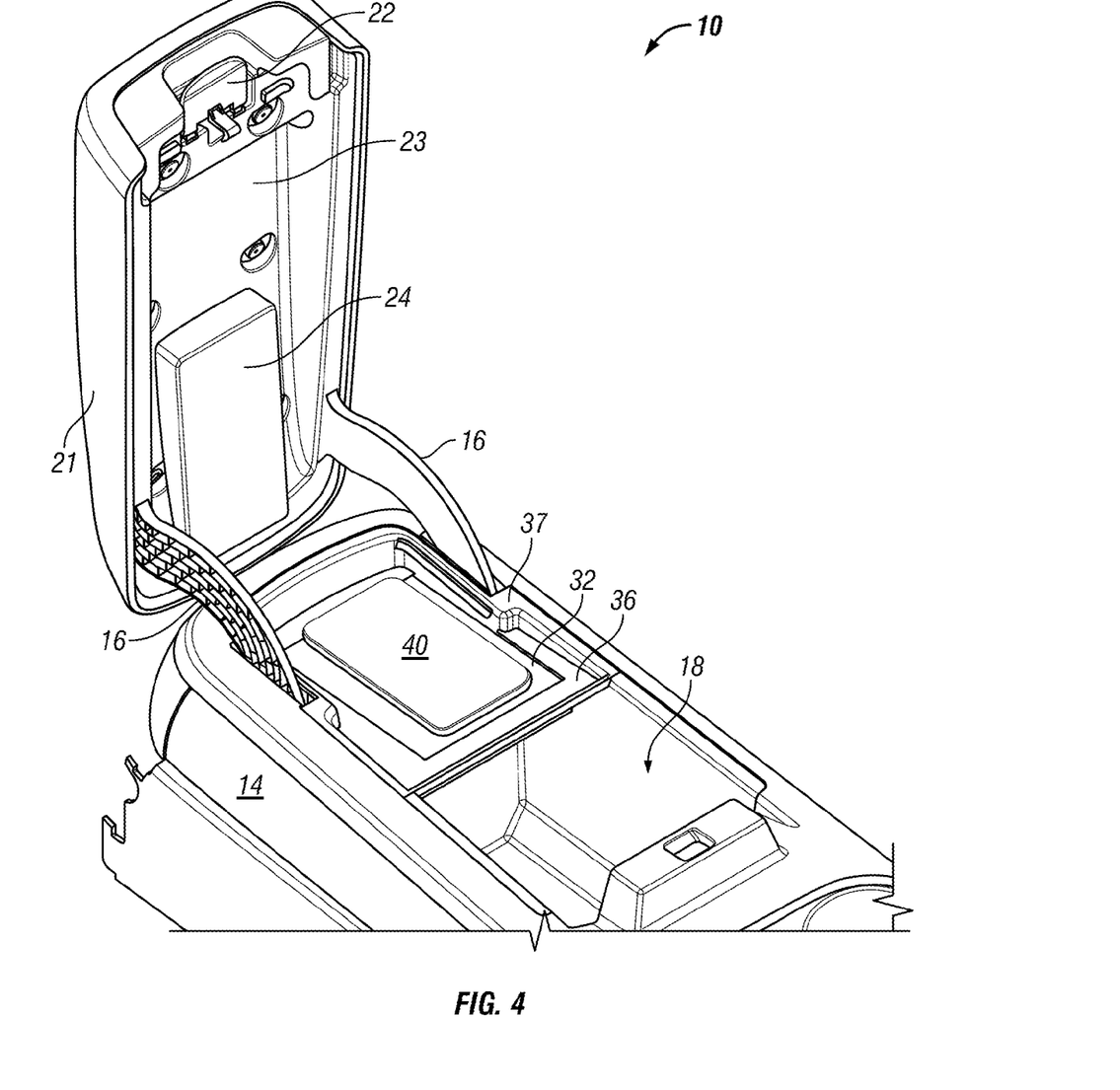
Figure 5:
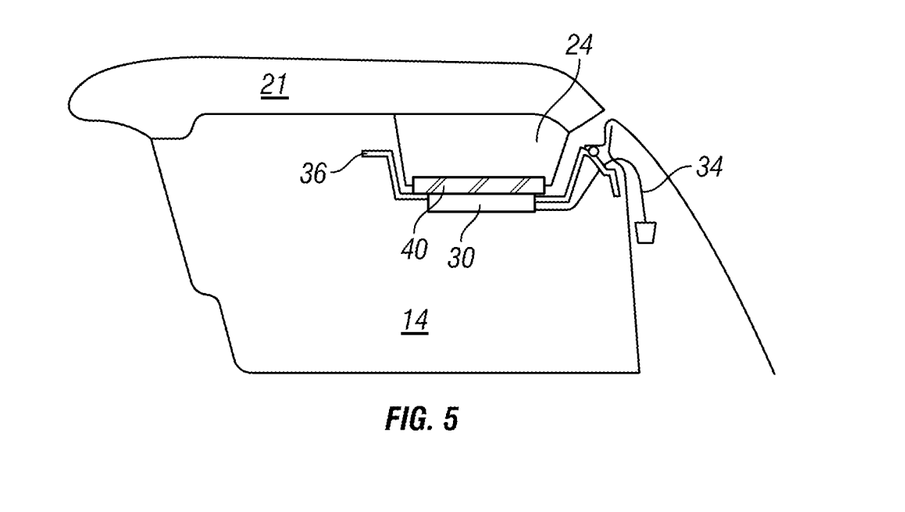
FIG. 5 is a side view of a floor console armrest assembly in accordance with some of the disclosed embodiments when a console lid is in a closed position.

FIGS. 1, 3 and 4 are perspective views of a floor console armrest assembly 10 in accordance with some of the disclosed embodiments, and FIG. 2 is a top view of a floor console armrest assembly 10 in accordance with some of the disclosed embodiments. FIGS. 1-4 illustrate the floor console armrest assembly 10 when a console lid 21 of the floor console armrest assembly 10 is in an open position. FIG. 5 is a side view of a floor console armrest assembly 10 in accordance with some of the disclosed embodiments. FIG. 5 illustrates the floor console armrest assembly 10 when the console lid 21 is in a closed position.

The floor console armrest assembly 10 includes a console base 14 and a console lid 21. The console lid 21 is coupled to the console base 14 via a hinge 16. The console base 14 includes a storage compartment 18 and other features such as cup holders 19. Numerous other features can be included on or within the assembly 10 without departing from the scope of the present invention, but are not illustrated for sake of clarity. In accordance with some of the disclosed embodiments, the console lid 21 includes a bottom surface 23 having a securing apparatus 24 mounted thereon, and a mounting apparatus 36 with a tray 37 is provided within the storage compartment 18 of the floor console armrest assembly 10.

In accordance with some of the disclosed embodiments, a wireless charging module 30 can be mounted to an underside of the mounting apparatus 36, and therefore resides in the compartment 18 beneath the mounting apparatus 36. The mounting apparatus 36 holds the wireless charging module 30 in place within the storage compartment 18.

In accordance with some of the disclosed embodiments, the securing apparatus includes the securing apparatus 24 and the mounting apparatus 36. As will be explained below, when the console lid 21 is moved into a closed position (FIG. 5), the securing apparatus 24 and the mounting apparatus 36 cooperate to hold the rechargeable electronic device 40 in a fixed location with respect to the charging surface 32 of the wireless charging module 30, and to secure the rechargeable electronic device 40 in a fixed position within the storage compartment 18. The disclosed securing apparatus 24 can prevent the rechargeable electronic device 40 from moving with respect to the charging surface 32 of the wireless charging module 30 even when being subjected to forces within the vehicle. The disclosed securing apparatus 24 allows the rechargeable electronic device 40 to be contained and secured within the vehicle during the charging operation, and makes it unnecessary for an occupant to reposition the rechargeable electronic device 40 with respect to the wireless charging module 30 (e.g., while the vehicle is moving during driving).

Figure 6:
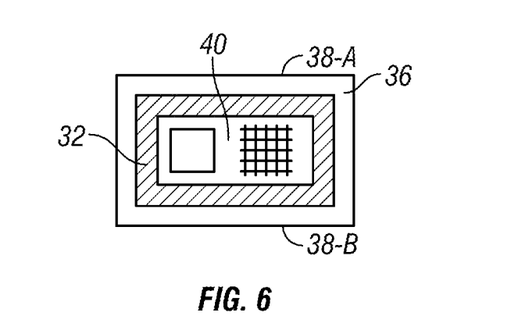
FIG. 6 is a top view of a mounting apparatus that sits within the floor console armrest assembly in accordance with some of the disclosed embodiments.

FIG. 6 is a top view of the mounting apparatus 36 and tray 37 that sit within the floor console armrest assembly 10 in accordance with some of the disclosed embodiments.

The securing apparatus 24 is directly or indirectly secured or attached to the underside of the console lid 21, and can be any suitable material that will provide an interface to the rechargeable electronic device 40 that has sufficient rigidity to hold the rechargeable electronic device 40 in a fixed position with respect to the charging surface 32 when the console lid 21 is in a closed position, but will not damage the rechargeable electronic device 40 when the console lid 21 is in a closed position. In some embodiments, the securing apparatus 24 can be fabricated from a lightweight cellular engineering material such as a solid foam material. In some implementations, the securing apparatus 24 can be fabricated from open-cell structured foam materials (also known as reticulated foams). As is known to those skilled in the art, open-cell structured foams contain pores that are connected to each other and form an interconnected network which is relatively soft. In one implementation, the securing apparatus 24 can be fabricated from a polymer-based open-cell foam material such as polyurethane-based foam material.

The securing apparatus 24 can have any shape or geometry that allows it to contact the device 40 and hold the device 40 in a fixed position when the console lid 21 is closed. In one embodiment, the securing apparatus 24 can have a block-like structure. In one particular embodiment, the securing apparatus 24 can be a block-like structure made from a soft open-cell foam material.

The wireless charging module 30 can be mounted to an underside (not shown) of the mounting apparatus 36 such that the mounting apparatus 36 holds the rechargeable electronic device 40 in place within the storage compartment 18 of the floor console armrest assembly 10. In one implementation, the mounting apparatus 36 has edge portions 38-A, 38-B (adjacent to and around the perimeter of the tray 37) that are supported by a lip of the console base 14. The tray 37 can have a center portion (e.g., located in the center of the tray 37 and centered within the tray 37) that is in alignment with the securing apparatus 24 when the console lid 21 is in a closed position. The center portion overlies at least a portion of the charging surface 32 of the wireless charging module 30.

When the console lid 21 is moved downward towards its closed position, the hinge 16 retracts into the floor console armrest assembly 10 and the console lid 21 moves downward until it eventually reaches a closed position, as illustrated in FIG. 5. When the console lid 21 is in the closed position, the securing apparatus 24 presses against the rechargeable electronic device 40 and along with the center portion (that is above the charging surface 32) to hold the rechargeable electronic device 40 in a fixed position with respect to the charging surface 32 of the wireless charging module 30 so that the rechargeable electronic device 40 is secured or maintained in the fixed position with respect to the charging surface 32 of the wireless charging module 30.

As will be described below, a rechargeable electronic device 40 can be placed on the exposed portion of the charging surface 32 of the wireless charging module 30 so that the rechargeable electronic device 40 can be charged or recharged.

Wireless Charging Module

Figure 7:
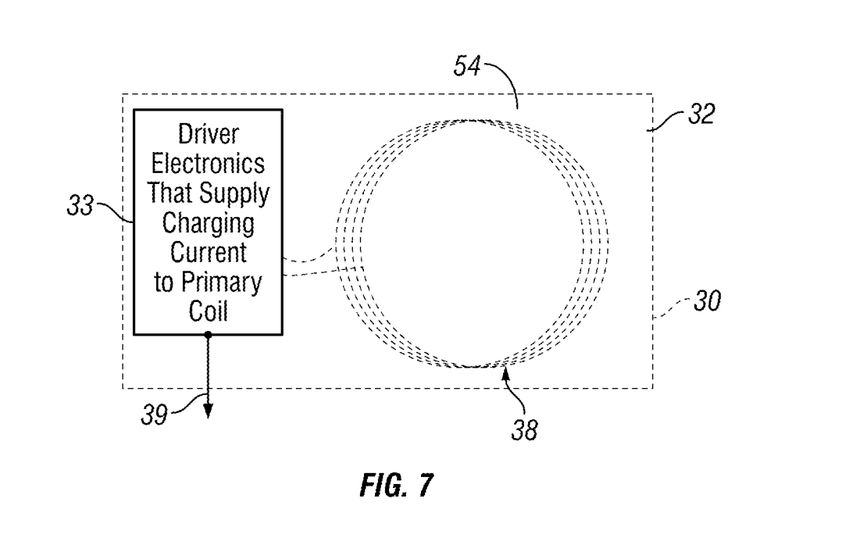
FIG. 7 is a block diagram of a top view of a wireless charging module in accordance with some of the disclosed embodiments.
Figure 8:
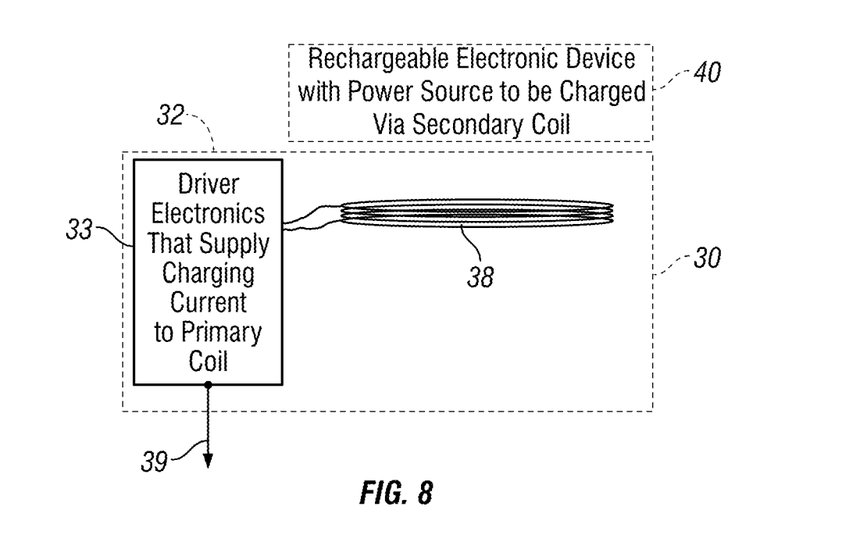
FIG. 8 is a block diagram of a side view of the wireless charging module of FIG. 7 in accordance with some of the disclosed embodiments.

FIG. 7 is a block diagram of a top view of a wireless charging module 30 of FIGS. 1-4 in accordance with some of the disclosed embodiments. FIG. 8 is a block diagram of a side view of the wireless charging module 30 of FIG. 7 in accordance with some of the disclosed embodiments. In accordance with the disclosed embodiments, the wireless charging module 30 includes a charging surface 32, a driver module 33, and primary inductive charging coils 38 embedded within the wireless charging module 30. The driver module 33 includes driver electronics that are coupled via wires to a vehicle power supply, such as a battery (not illustrated). The driver module 33 uses the vehicle power supply (not illustrated) to apply an oscillating electric potential across the primary inductive charging coils 38.

The primary inductive charging coils 38 serve as the primary coil of an inductive couple.

The rechargeable electronic device 40 includes a receiver module (not illustrated) that includes a secondary coil (not illustrated).

When an oscillating electric potential is applied across the primary coils 38, an oscillating magnetic field is generated, which may in turn induce an oscillating electrical current in the secondary coil (not illustrated) of the rechargeable electronic device 40 if the secondary coil of the rechargeable electronic device 40 is placed close to the primary inductive charging coils 38. In this way, electrical energy is transmitted from the primary inductive charging coils 38 to the secondary coil by electromagnetic induction without the two coils being conductively connected. When electrical energy is transferred from the primary inductive charging coils 38 to a secondary coil the pair are said to be inductively coupled. An electric load (e.g., battery of the rechargeable electronic device 40) wired across (e.g., in series) with the secondary coil may draw energy from the power source when the secondary coil is inductively coupled to the primary inductive charging coils 38.

Thus, inductive coupling between the primary inductive charging coils 38 and the secondary coil of the rechargeable electronic device 40 allows energy to be transferred from the power supply (not illustrated) to an electric load (e.g., battery of the rechargeable electronic device 40) without any conduction path (e.g., connecting wires). The wireless charging module 30 allows a vehicle occupant to place their rechargeable electronic device 40 on the exposed charging surface 32 of the wireless charging module 30 to provide a simple, fast and efficient way to keep the rechargeable electronic device 40 charged without the drawbacks associated with a wired charger that requires a cable.

The wireless charging module 30 also includes a variety of other features.

For example, magnetic attraction between the receiver module of the rechargeable electronic device 40 and the wireless charging module 30 assures that alignment between the primary inductive charging coils 38 and the secondary coil of the rechargeable electronic device 40 is precise and that the efficient charging will occur. This helps ensure that the rechargeable electronic device 40 can be charged as fast as or faster than with wired chargers.

In addition, the receiver module of the rechargeable electronic device 40 and the wireless charging module 30 can communicate with each other e.g., via RFID, to allow the wireless charging module 30 to deliver an exact amount of power for a proper length of time to the rechargeable electronic device 40 so that transfer of power is safe and efficient and no energy is wasted.

The wireless charging module 30 can also include hardware (e.g., speakers, LEDs, etc.) that provides audio and visual indictors to the user. For example, in some implementations, a unique sound tells the user that a solid inductive connection has been made between the wireless charging module 30 and rechargeable electronic device 40 and that the rechargeable electronic device 40 is charging. In other implementations, a corresponding light indicator (e.g., via LEDs) informs the user that wireless charging is occurring. Another unique sound can be communicated when the rechargeable electronic device 40 is removed from the charging surface 32 of the wireless charging module 30.

When a rechargeable electronic device 40 reaches full charge, power to that rechargeable electronic device 40 is shut off. This not only saves energy, but it also prevents overcharging of the device's battery, which can shorten battery life. Once full power is achieved and the shut off has occurred, the rechargeable electronic device 40 will continue monitor the status of the battery if the battery is not fully charged the wireless charging module 30 can initiate and resume charging until the battery is fully charged.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicle, comprising:
a floor console armrest assembly, comprising: a console base comprising a storage compartment; and a console lid coupled to the console base;
a wireless charging apparatus mounted within the console base and being designed to inductively couple magnetic energy to wirelessly charge a rechargeable electronic device; and
a securing apparatus configured to secure the rechargeable electronic device, comprising:
a tray mounted in the storage compartment within the console base and above the wireless charging apparatus; and
a securing structure mounted on the console lid, wherein the securing structure cooperates with the tray to secure the rechargeable electronic device in a fixed position with respect to the wireless battery charging apparatus.

2. The vehicle according to claim 1, further comprising:
a mounting apparatus located within the storage compartment, wherein the tray is part of the mounting apparatus.

3. The vehicle according to claim 2, wherein the wireless charging apparatus is mounted to an underside of the mounting apparatus, and resides in the storage compartment beneath the mounting apparatus.

4. The vehicle according to claim 2, wherein the wireless charging apparatus includes a charging surface,
wherein the securing structure has a shape that allows it to contact the rechargeable electronic device when the console lid is in a closed position, and
wherein the securing structure and the tray cooperate to hold the rechargeable electronic device in a fixed location with respect to the charging surface to secure the rechargeable electronic device in the fixed position within the storage compartment when the console lid is in the closed position.

5. The vehicle according to claim 4, wherein the tray has a center portion that overlies at least a portion of the charging surface, wherein the center portion is in alignment with the securing structure when the console lid is in the closed position.

6. The vehicle according to claim 4, wherein the securing structure presses against the rechargeable electronic device when the console lid is in the closed position to hold the rechargeable electronic device in the fixed position with respect to the charging surface so that the rechargeable electronic device is secured in the fixed position with respect to the charging surface.

7. The vehicle according to claim 2, wherein the console base includes a lip, wherein the mounting apparatus has edge portions that are disposed around the perimeter of the tray and supported by the lip of the console base.

8. The vehicle according to claim 1, wherein the securing structure comprises a lightweight cellular material.

9. The vehicle according to claim 8, wherein the lightweight cellular material comprises a solid foam material.

10. The vehicle according to claim 1, wherein the securing structure comprises a reticulated foam material.

11. The vehicle according to claim 1, wherein the securing structure comprises a polymer-based open-cell foam material.

12. The vehicle according to claim 11, wherein the polymer-based open cell foam material comprises polyurethane-based foam material.

13. The vehicle according to claim 1, wherein the console lid is pivotably coupled to the console base, and wherein the tray is separate from the console base, and wherein the securing structure is a separate component from the console lid that is mounted on the console lid.

14. A vehicle, comprising:
a floor console armrest assembly comprising: a console lid and a console base comprising a storage compartment, wherein console lid that serves as an armrest and covers the storage compartment;
a wireless battery charging apparatus mounted within the console base of the floor console armrest assembly and being designed to inductively couple magnetic energy to wirelessly charge a rechargeable electronic device; and
a securing apparatus configured to secure the rechargeable electronic device, comprising:
a tray mounted within the console base and the storage compartment and being configured to hold a battery, wherein the wireless battery charging apparatus is mounted to the tray and wherein the tray is located above the wireless charging apparatus; and
a securing structure mounted on the console lid, wherein the securing structure cooperates with the tray to secure the battery in a fixed position with respect to the wireless battery charging apparatus.

15. The vehicle according to claim 14, wherein the wireless battery charging apparatus is mounted to an underside of the tray.

16. The vehicle according to claim 14, the console lid further comprising: a bottom surface having the securing structure mounted thereon.

17. The vehicle according to claim 14, wherein the battery is housed in a device, and wherein the wireless battery charging apparatus includes a charging surface, and wherein the securing structure has a shape that allows it to contact the device when the console lid is in a closed position.

18. The vehicle according to claim 17, wherein the securing structure and the tray cooperate such that the securing structure presses against the device when the console lid is in the closed position to hold the device in a fixed location with respect to the charging surface to secure the device in the fixed position with respect to the charging surface within the storage compartment when the console lid is in the closed position.

19. The vehicle according to claim 14, wherein the console lid is pivotably coupled to the console base, and wherein the tray is separate from the console base, and wherein the securing structure is a separate component from the console lid that is mounted on the console lid.

* * * * *